(12) United States Patent
Morschheuser

(10) Patent No.: US 10,430,146 B2
(45) Date of Patent: Oct. 1, 2019

(54) METHOD FOR PROVIDING INFORMATION REGARDING PARKING SPOTS

(71) Applicant: Robert Bosch GmbH, Stuttgart (DE)

(72) Inventor: Benedikt Morschheuser, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 15/183,286

(22) Filed: Jun. 15, 2016

(65) Prior Publication Data

US 2016/0370963 A1    Dec. 22, 2016

(30) Foreign Application Priority Data

Jun. 16, 2015 (DE) .......................... 10 2015 211 051

(51) Int. Cl.
*G06F 3/14* (2006.01)
*G01C 21/36* (2006.01)
*G08G 1/14* (2006.01)
*H04W 4/04* (2009.01)

(52) U.S. Cl.
CPC ....... *G06F 3/1454* (2013.01); *G01C 21/3685* (2013.01); *G08G 1/14* (2013.01); *H04W 4/04* (2013.01)

(58) Field of Classification Search
CPC .................................................... G06Q 10/02
USPC .................. 715/700, 851, 855; 701/454, 457
See application file for complete search history.

(56) References Cited

U.S. PATENT DOCUMENTS

| | | | |
|---|---|---|---|
| 9,772,193 B1* | 9/2017 | Mendelson | G01C 21/206 |
| 2012/0262305 A1 | 10/2012 | Woodard et al. | |
| 2013/0066667 A1* | 3/2013 | Gulec | G06Q 10/06 |
| | | | 705/7.13 |
| 2013/0113936 A1 | 5/2013 | Cohen et al. | |
| 2014/0085112 A1* | 3/2014 | Gruteser | B60Q 9/004 |
| | | | 340/932.2 |
| 2014/0132767 A1 | 5/2014 | Sonnabend et al. | |
| 2014/0309924 A1* | 10/2014 | Varoglu | G01C 21/206 |
| | | | 701/410 |
| 2015/0310744 A1* | 10/2015 | Farrelly | G06Q 10/063114 |
| | | | 340/932.2 |
| 2015/0371541 A1* | 12/2015 | Korman | G08G 1/147 |
| | | | 340/932.2 |
| 2016/0180712 A1* | 6/2016 | Rosen | G01C 21/36 |
| | | | 705/5 |

FOREIGN PATENT DOCUMENTS

| | | |
|---|---|---|
| DE | 102012201472 A1 | 8/2013 |
| DE | 102012216994 A1 | 3/2014 |
| WO | 2014100584 A1 | 6/2014 |

OTHER PUBLICATIONS http://www.parkopedia.de/mobile-parking-apps, dated Jun. 15, 2016, 2 pages.

* cited by examiner

*Primary Examiner* — Cao H Nguyen

(74) *Attorney, Agent, or Firm* — Norton Rose Fulbright US LLP; Gerard Messina

(57) ABSTRACT

A method for providing information regarding parking spots, including transmitting the information input by a user into an input device to a database; generating a digital map of the parking spots; and transmitting the digital map to a user community, contents of the digital map being modified as a function of an input activity of the user by using at least one gamified element.

14 Claims, 2 Drawing Sheets

METHOD FOR PROVIDING INFORMATION REGARDING PARKING SPOTS

CROSS REFERENCE

The present application claims the benefit under 35 U.S.C. § 119 of German Patent Application NO. DE 102015211051.6 filed on Jun. 16, 2015, which is expressly incorporated herein by reference in its entirety.

FIELD

The present invention relates to a method for providing information regarding parking spots. The present invention furthermore relates to a system for providing information regarding parking spots.

BACKGROUND INFORMATION

In conventional so-called crowd-sourcing applications, an open call attempt to reach many people who are to perform a specific task. A use of so-called "gamification elements" is conventional in connection with location-dependent crowd-sourcing applications, for example in the applications WAZE® or Yelp® (www.yelp.com). In the case of Yelp®, the user is motivated to "check in" in real locations, for example train stations or shops. For this purpose, the user is able to become the "duke" of the location and to earn badges. In the case of WAZE®, the user has a personal avatar, which the user is able to develop further if he provides information about traffic jams or speed traps to a community.

In connection with parking spots, the Parkopedia application (www.parkopedia.de/mobile-parking-apps) uses points, badges and ranking lists as gamification elements in order to motivate people to provide information about parking spots to a community. German Patent Application No. DE 10 2012 216 994 A1 describes a method for referring parking spots and a free-parking spot assistance system, road users ascertaining information about free parking spots and transmitting the information to a cloud computing system, the cloud computing system recording information about the free parking spots in a parking spot map in a retrievable manner. Furthermore disclosed are a computer program and a free-parking spot assistant system, which is suitable for implementing the method.

SUMMARY

An objective of the present invention is to provide an improved method for providing information about parking spots.

The objective may be attained, according to a first aspect of the present invention, by a method for providing information regarding parking spots, having the steps:
  transmitting the information input by a user into an input device to a database;
  generating a digital map of the parking spots; and
  transmitting the digital map to a user community, contents of the digital map being modified as a function of an input activity of the user by using at least one gamified element.

In this manner, a so-called "crowd creation" approach is utilized, which is enriched by gamified motivational elements, in order to motivate people to provide to a community data about parking spots that are as comprehensive as possible. For this purpose, gamified motivational elements are provided in particular.

According to a second aspect, the objective is attained by a system for providing information regarding parking spots, having:
  input devices, into which users are able to input information; and
  a database, to which the information is transmittable, the database being able to generate a digital map of the parking spots, the digital map being transmittable to a user community, contents of the digital map being modifiable as a function of an input activity of the user by using at least one gamified element.

One advantageous development of the method provides for the information to include at least one of the following: location of the parking spot, cost of the parking spot, properties of the parking spot, image of the parking spot. In this manner, it is possible to input specific information about parking spots, which are made available to the user community, and which satisfy specific informational needs of the user community.

Another advantageous development of the method provides for the user to be assigned a virtual street and/or a virtual area. This makes it possible to increase a motivation for the user to input data.

Another advantageous development of the method provides for the assigned street and/or the assigned area to be symbolized graphically. This advantageously increases a visual recognizability of the assigned street and/or the assigned area.

Another advantageous development of the method provides for an image and/or information of the user to be transmitted to the database. In this manner, other users of the user community are able to see who has participated where in an information input. A kind of personalization effect is thereby realized for the user, which is able to increase a motivation for inputting data.

Another advantageous development of the method provides for a message to be communicated to a visitor of a defined street and/or a defined area. This makes it possible to produce a personal relationship and a feeling of belonging to the user community, which may increase a motivation for the user to input information.

Another advantageous development of the method provides for an area to be taken away from a user and to be assigned to another user if the other user inputs a defined extent of information regarding a defined street and/or a defined area into his input device. In this manner, it is possible for areas to be taken away again if information exceeds a defined extent. This implements a kind of contest idea, which advantageously may increase the motivation for inputting information.

Another advantageous development of the method provides for a bonus to be transmitted to a user if other users are present on the street assigned to the user and/or in the area assigned to the user. This makes it possible to realize a kind of reward effect such that a kind of virtual wealth may be built us, which may increase a motivation for inputting information regarding parking spots.

Another advantageous development of the method provides for at least one request to be made of a user regarding an input of information, a bonus being transmitted to the user when the request is fulfilled. This also makes it possible to implement a kind of contest principle such that the user is given motivational incentives for inputting information about parking spots.

Another advantageous development of the method provides for the user to be able to build virtual objects on assigned streets and/or assigned areas. This implements a kind of conquest principle, whereby a gamified incentive is created for an intensive usage of the method.

The present invention is described below in detail with additional features and advantages with reference to several figures. In this context, all of the described or represented features, alone or in any combination, form the subject matter of the present invention, regardless of their combination, formulation, or representation in the specification and in the figures. The figures are primarily intended to illustrate the general principles of the present invention.

DETAILED DESCRIPTION OF EXAMPLE EMBODIMENTS

Figure 1:
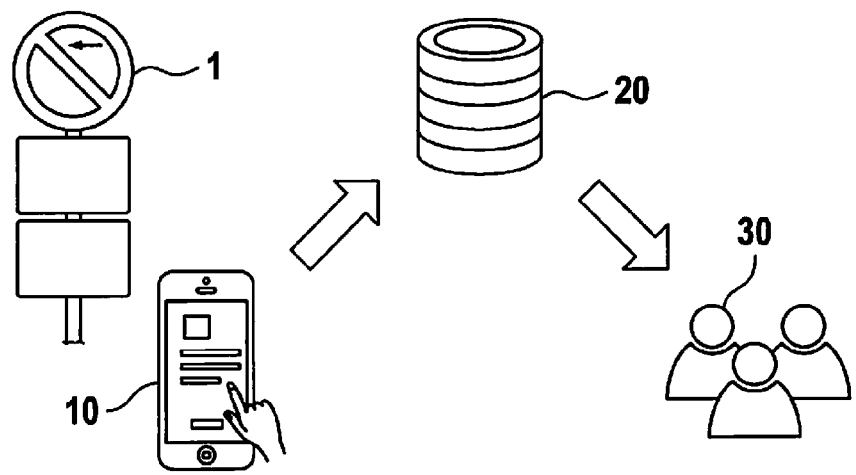
FIG. 1 shows a basic mode of operation of the example method according to the present invention.

FIG. 1 shows a basic representation for explaining the basic principle of the example method of the present invention.

A user is able to input information 1 regarding parking spots of a street and/or an area into a mobile input device 10 (for example a smart phone, tablet, notebook, navigation device, etc.). At a defined point in time (e.g. immediately or regularly after defined intervals), input device 10 transmits information 1 to a central database 20 (e.g. in the form of a server device), which aggregates information 1 of the parking spots into a digital map 40 and transmits the aggregated digital map 40 to a user community 30.

Figure 2:
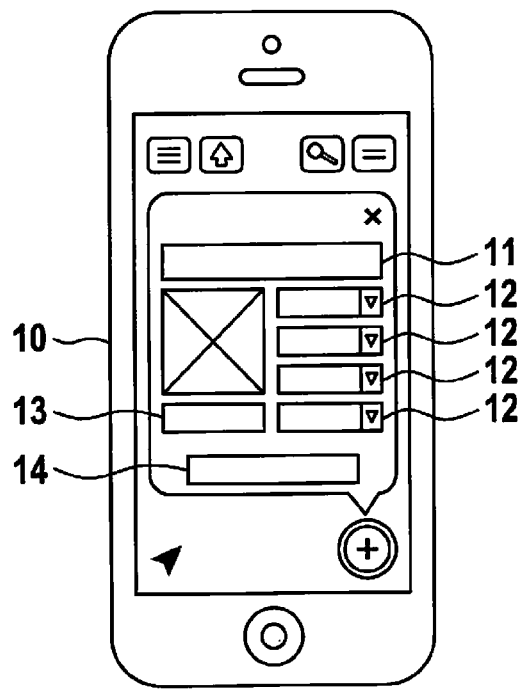
FIGS. 2 to 5 show various touch screens of digital mobile input devices for inputting information about parking spots.

FIG. 2 shows in an exemplary manner a touch screen of input device 10 having an input mask, into which the user is able to input the information 1. An input field 11 is shown, into which e.g. a name of a street having available parking spots may be input. Input fields 12 are also shown, into which various properties of parking spots may be input such as for example the price of the parking spot per unit of time, a capacity of the parking spot, a type of the parking spot, properties or restrictions of the parking spot (e.g., handicapped parking), etc. An input field 13 may be provided to upload for example an image of the parking spot to database 20. An input field 14 may be provided in order virtually to "capture" a street and/or an area.

In this manner, users of the method are able to transmit location-dependent information about parking spots from their terminal device (for example a mobile telephone or a communication device of a motor vehicle) to a central server. By transmitting the information 1, the user is able to capture defined places on a digital map 40. If a user owns in this manner multiple virtual parking spots or streets, then he is able to capture, according to certain patterns, entire areas or cities in a gamified manner.

Figure 3:
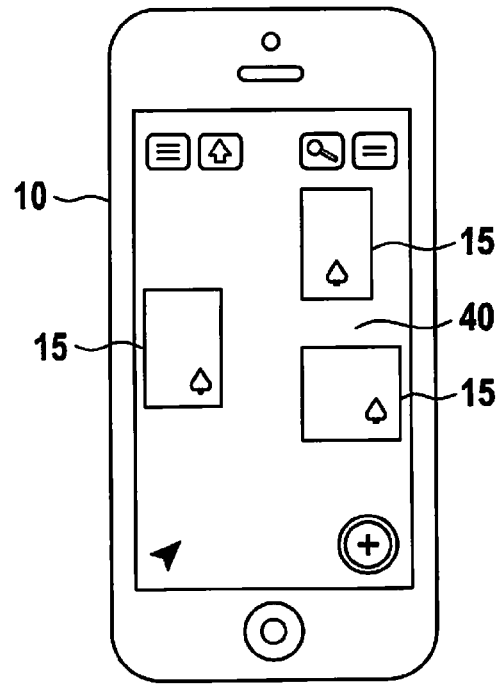

FIG. 3 schematically shows a touch screen having areas 15 captured in this manner, which are visually displayed for the user on virtual digital map 40. The user is also able to see areas 15 of other users on digital map 40. By transmitting a defined extent of new information 1, it also becomes possible for the user virtually to "take" streets and areas from other users in a gamified fashion. This is possible, for example, in the event that more information was input for a specific area than by a previous user or co-user.

This corresponds to an implementation of gamifyingly motivating elements, which are to evoke or reinforce in the user in gamified fashion a motivation for inputting information 1 regarding parking spots that is as complete as possible.

In this manner, conventional gaming elements, e.g., as from board games and video games, are transferred into the context a technical application ("gamification"). The method according to the present invention is preferably implemented as a software (for example an app), which allows the user to participate in a virtual game regarding parking spots.

Figure 4:
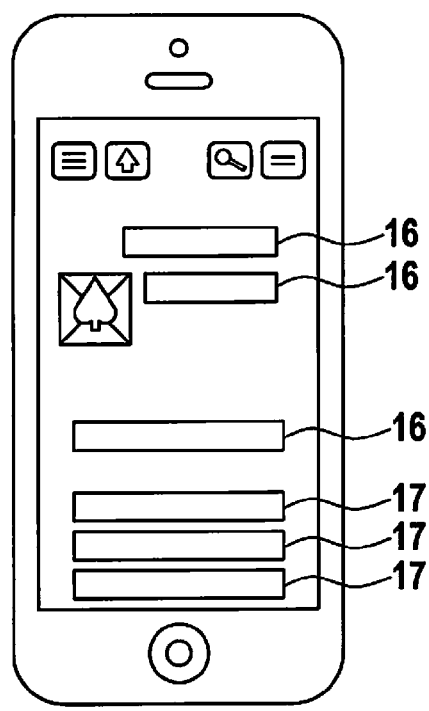

FIG. 4 shows a touch screen of a smart phone, on which a user is working on his own area. For this purpose, an input field 16 may be provided, which specifies for example the name of a captured area 15. Furthermore, an input field 16 may be used to transmit a message to a visitor of area 15. Ownership situations of the respective areas 15 may be graphically represented in display fields 17. This makes it possible for example to signal to users in percentages the ownership situation numerically or graphically. It is also conceivable to transmit to a user a specific amount of virtual currency if a defined number of areas 15 were visited.

Figure 5:
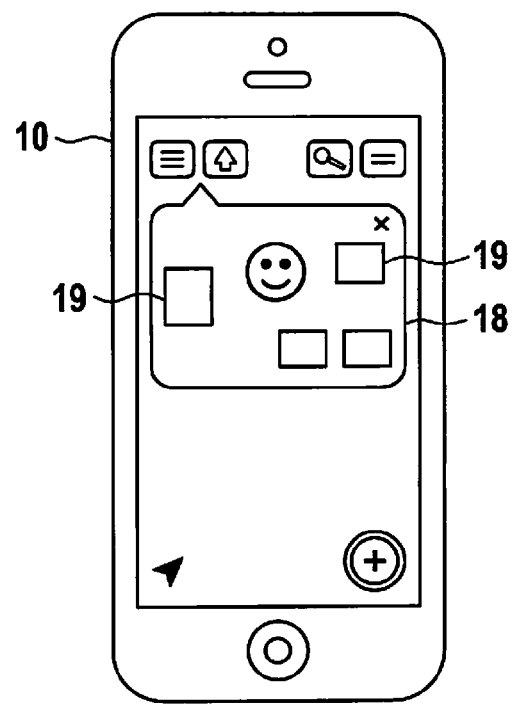

FIG. 5 shows another schematic graphical operator interface of digital input device 10 with additional fields. The figure shows a display field 18, which may contain a profile of the user. Furthermore, gaming achievements of the user may be shown in display field 18. Furthermore, a user community 30 may be accessed or visualized via an access field 19, or game bonuses of the user may be displayed numerically or graphically via display field 19.

Possible additional functions of system 200 include for example:

challenges, which may be communicated to a user of user community 30 as goals to be achieved. When completing the challenge, the user is able to activate bonuses, earning for example a reward in the form of a defined amount in virtual currency.

It is also possible to build virtual buildings or to place virtual objects in assigned or captured areas 15.

It is furthermore possible to integrate vouchers or coupons of advertising businesses into the user interface. In this manner, it is possible to produce a motivation for placing information about parking spots near the businesses such that the latter are able to transmit vouchers or coupons when a defined number of items of information 1 are input.

Figure 6:
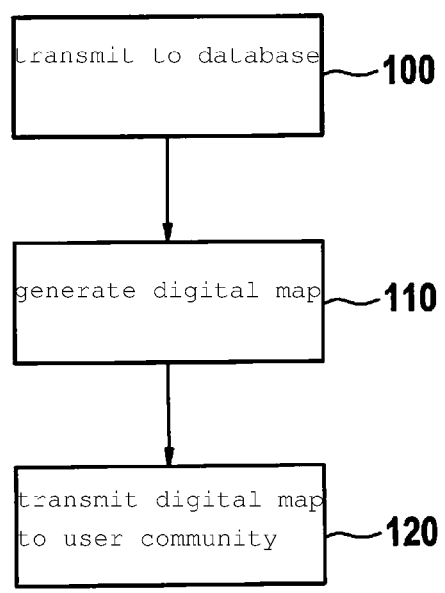
FIG. 6 shows a basic sequence of one specific embodiment of the method according to the present invention.

FIG. 6 shows a simplified representation of a sequence of a specific embodiment of the method of the present invention.

In a step 100, the information 1 input by a user into an input device 10 is transmitted to a database 20.

In a step 110, a digital map 40 of the parking spots is generated.

In a step 120, the digital map is transmitted to a user community 30, contents of the digital map being modified as a function of an input activity of the user by using at least one gamified element.

In summary, the present invention provides a method for providing information regarding parking spots by using at least one gamified element, which is to increase a motivation of the user for inputting information that is as complete as possible.

One skilled in the art will suitably modify and/or combine with one another the features of the present invention without deviating from the essence of the present invention.

What is claimed is:

1. A method for providing information regarding parking spots, comprising:
   transmitting to a database information regarding a parking spot, input by a user into an input device;
   generating a digital map of parking spots; and
   transmitting the digital map to a user community, contents of the digital map being modified as a function of an input activity of the user by using at least one gamified motivational element,
   wherein the at least one gamified motivational element includes capturing at least one defined place on the digital map, wherein the user is able to own or capture virtual parking spots or streets.

2. The method as recited in claim 1, wherein the information includes at least one of the following: location of the parking spot, cost of the parking spot, properties of the parking spot, image of the parking spot.

3. The method as recited in claim 1, wherein the user is assigned at least one of a virtual street and a virtual area.

4. The method as recited in claim 3, wherein the at least one of the assigned virtual street and the assigned virtual area is symbolized graphically in the digital map.

5. The method as recited in claim 1, wherein at least one of: i) an image of the user, and ii) information of the user, is transmitted to the database.

6. The method as recited in claim 1, wherein a message is transmitted to a visitor of one of: i) a defined street, and ii) a defined area.

7. The method as recited in claim 3, wherein an area is taken away from a user and is assigned to another user if the other user inputs a defined extent of information regarding at least one of: i) a defined street, and ii) a defined area, into an input device of the other user.

8. The method as recited in claim 3, wherein a bonus is transmitted to a user if other users are present at least one of: i) on a street corresponding to the virtual assigned to the user, and ii) in an ara corresponding to the virtual area assigned to the user.

9. The method as recited in claim 1, wherein at least one request is made of a user regarding an input of information, a bonus being transmitted to the user when the request is fulfilled.

10. The method as recited in claim 3, wherein the user builds virtual objects on at least one of assigned virtual streets and in assigned virtual areas.

11. A system for providing information regarding parking spots, comprising:
    input devices into which users are able to input information; and
    a database to which the information is transmittable, wherein the database is able to generate a digital map of the parking spots, the digital map being transmittable to a user community, contents of the digital map being modifiable as a function of an input activity of the users by using at least one gamified motivational element,
    wherein the at least one gamified motivational element includes capturing at least one defined place on the digital map, wherein the user is able to own or capture virtual parking spots or streets.

12. The system as recited in claim 11, wherein input fields are displayable on the input device, via which it is possible to input parameters of the parking spot.

13. The system as recited in claim 11, wherein display fields are displayable on the input device, via which it is possible to display properties of the parking spot.

14. A non-transitory computer-readable storage medium storing a computer program, the computer program, when executed on a processor, causing the processor to perform:
    transmitting to a database information regarding a parking spot, input by a user into an input device;
    generating a digital map of parking spots; and
    transmitting the digital map to a user community, contents of the digital map being modified as a function of an input activity of the user by using at least one gamified motivational element,
    wherein the at least one gamified motivational element includes capturing at least one defined place on the digital map, wherein the user is able to own or capture virtual parking spots or streets.

* * * * *